Figure 1:
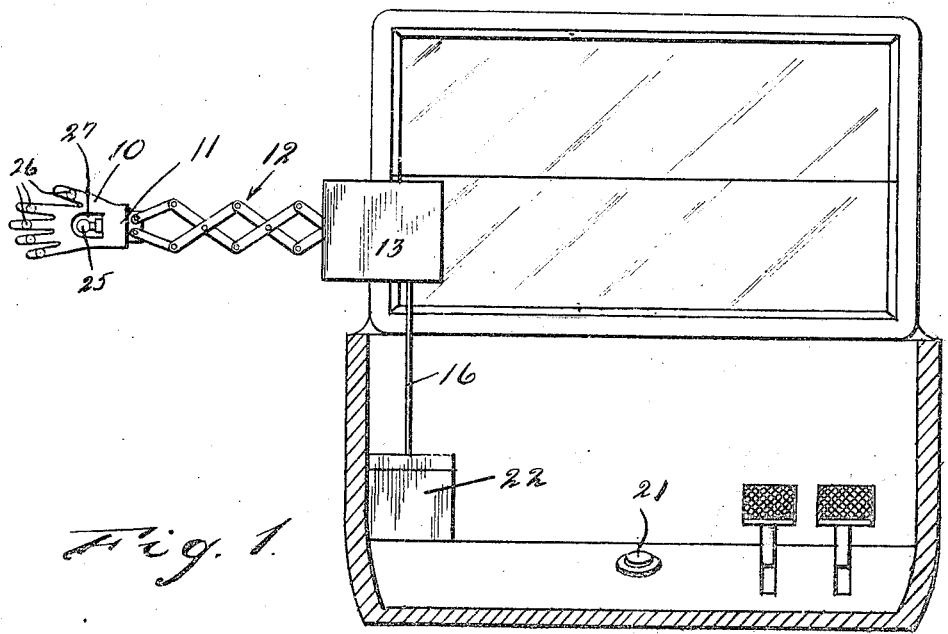

H. LIEBERMAN.
DIRECTION SIGNAL.
APPLICATION FILED MAY 29, 1918.

1,299,361.

Patented Apr. 1, 1919.
2 SHEETS—SHEET 1.

Witnesses
J. M. Jester

Inventor
H. Lieberman
By Victor J. Evans
Attorney

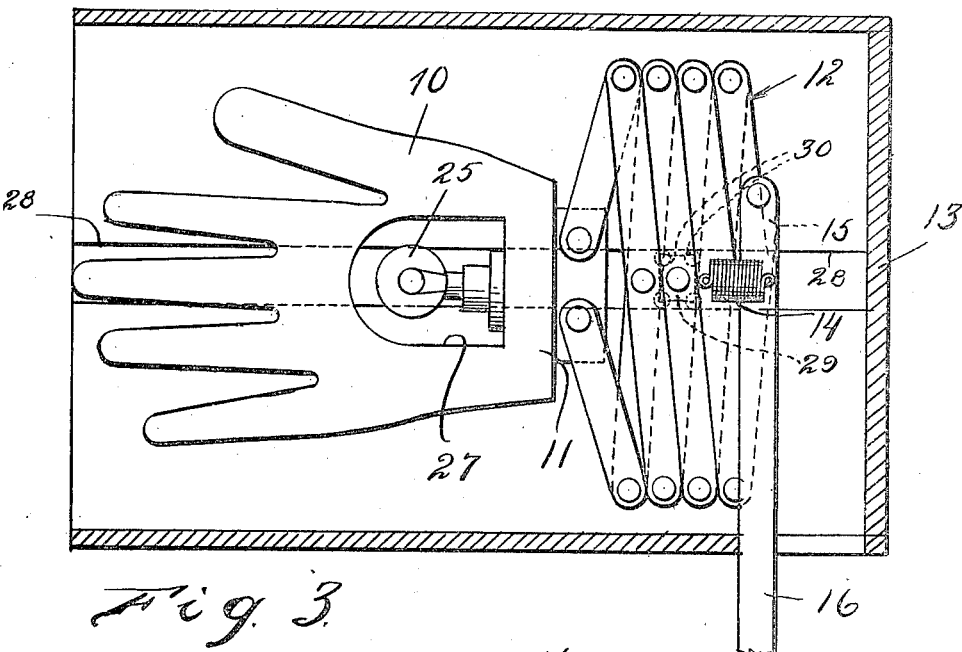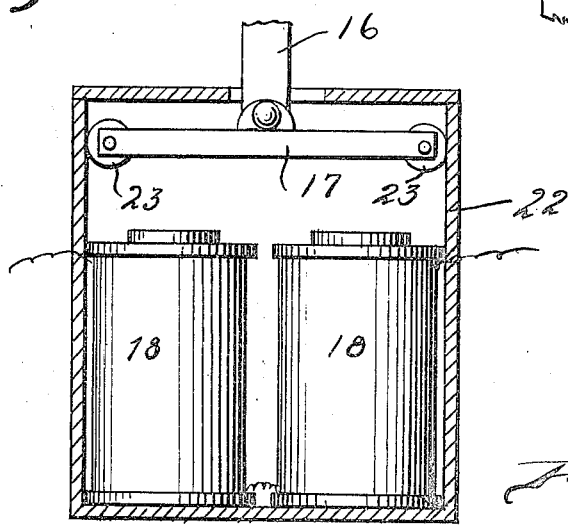

UNITED STATES PATENT OFFICE.

HYMAN LIEBERMAN, OF MARINETTE, WISCONSIN.

DIRECTION-SIGNAL.

1,299,361.  Specification of Letters Patent.  Patented Apr. 1, 1919.

Application filed May 29, 1918. Serial No. 237,260.

*To all whom it may concern:*

Be it known that I, HYMAN LIEBERMAN, a citizen of the United States, residing at Marinette, in the county of Marinette and State of Wisconsin, have invented new and useful Improvements in Direction-Signals, of which the following is a specification.

The object of the invention is to provide a direction indicating signal for use in connection with automobiles and similar vehicles to denote the intention of the driver of the vehicle with regard to turning either to the right or the left or of stopping or reducing his speed for the benefit and instruction of the driver of a following vehicle with the general purpose of preventing or minimizing accidents due to collisions, and in that connection to provide a device for this purpose which can be controlled and operated by the driver of the vehicle without necessitating the removal of his hands from the steering wheel or controlling levers or other instrumentalities which are essential to the driving and control of the vehicle.

A further object of the invention is to provide an apparatus of this type and for this purpose which may be observed with equal facility in daylight and at night, and may be arranged on a vehicle without modification thereof, under such circumstances as to be relatively inconspicuous when not in use or when not adjusted to give an indication to a following driver, and which may be stored or disposed in the vehicle without occupying space which is necessary for other purpose or is ordinarily appropriated to the use of the occupants of the car.

Further objects and advantages of the invention will appear in the course of the following description, it being understood that changes in form, proportion and details may be resorted to within the scope of the claims without departing from the spirit of the invention.

Figure 2:
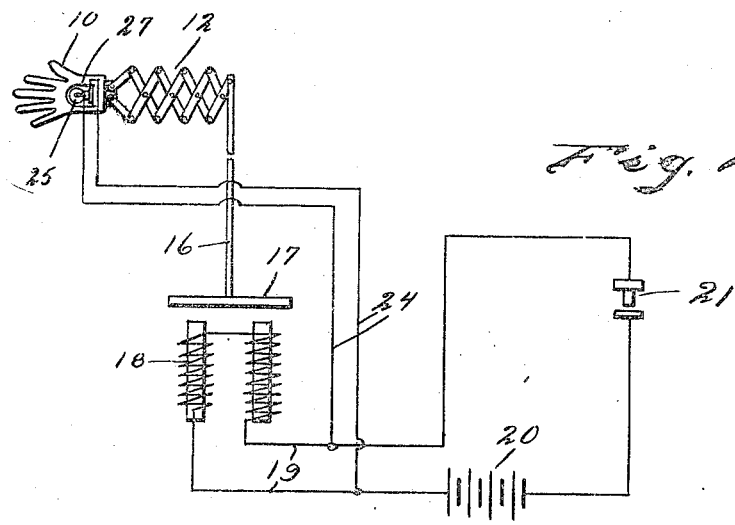

In the drawings:

Figure 1 is a view of a signaling apparatus arranged in operative position on a car, Fig. 2 is a diagrammatic view showing the various essential parts of the apparatus in their operative relations, Fig. 3 is a detail view of the indicator and the extensible arm or support by which it is carried, and Fig. 4 is a similar view of the operating means for the extension support.

Essentially the apparatus embodying the invention consists of an indicator which in this instance is represented as a hand 10 having a socket portion 11 which is connected with an extensible support or arm 12 which is of lazy-tongs construction and which may be mounted in any suitable position upon or relation with a vehicle body, preferably within a casing or housing 13 into which said support or arm may be folded under normal conditions and from which it may be projected, by means hereinafter explained, to indicate the intention of the driver of the vehicle. It will be understood that in order to provide for display of an indicator at either side of the vehicle, the apparatus as herein described is designed to be employed in duplicate, one of the seats of the combined hand and supporting arm being arranged at each side of the body of the vehicle, and both of which seats may be operated simultaneously when it is desired to indicate to the driver of a following vehicle that it is the intention to stop or reduce the speed of motion.

Connected with the elements of the lazy-tongs support in any suitable or preferred position, is a folding spring 14, the tension of which is sufficient to collapse the support when otherwise released, while connected with an element 15 of said support by means of a rod 16 or its equivalent is a plunger 17 which preferably constitutes the armature of an electromagnet 18 arranged in circuit through suitable conductors 19 with a battery 20 of the storage or any preferred type. Also a switch 21 of the push-button, treadle or other convenient form should be arranged in the same circuit within convenient reach of the operator to provide for closing the circuit whenever it is desired to extend the indicator for the purposes hereinabove explained.

In the construction illustrated the plunger or armature 17 is arranged for reciprocatory movement in a casing 22, and is provided with an anti-friction guiding roller 23 for contact therewith in order to insure accuracy of movement toward and from the magnet in the operation of the device.

Also included in the battery circuit through suitable branch conductors 24 are illuminating means such as lamp bulbs 25 and 26, the former preferably being arranged in an opening 27 formed in the body portion or palm of the hand representing the indicator so as to be visible both in front and in rear of the vehicle while the latter (which may, if preferred, or for reasons of economy, be omitted) are disposed upon the fingers of the indicator hand.

From the foregoing description it will be obvious that the actuation of the switch which may be arranged in a position for convenient pressure by the foot of the operator, will result in an extension of the indicator arm or support by the attraction of the armature toward the magnet, and if in circuit, as when the device is used at night, the above operation will be accompanied by the energizing of the illuminating device, and as above suggested one or the other of the mechanisms may be actuated to indicate to a driver in the rear of an intention to turn either to the right or to the left, or by an extension of both devices, it will be obvious to a following driver of an intention to check the speed or stop the machine, so that said following driver may be guided accordingly.

As a means for positively directing the movement of the lazy-tongs support a guide 28 may be arranged in the casing 13 longitudinally of the movement of said support, and the latter may be provided with a carriage 29 to operate in said guide, the same having anti-friction rollers 30 for facilitating such movement by rendering it substantially frictionless, said carriage being connected with the support by means of one of the transverse pivots between the elements of the lazy-tongs construction. This arrangement is particularly clearly shown in Fig. 3 of the drawing.

I claim:

In a signal device including a movable signal member and an actuating rod; means for moving the rod comprising a casing, an electro-magnet disposed within one end of said casing, said casing being provided with an opening for the passage of said rod, an armature disposed within the other end of said casing and movable longitudinally thereof, said armature being pivotally connected at its center with said rod and positioned for attraction by said magnet, and rollers carried by said armature at its ends and bearing against the inner walls of said casing.

In testimony whereof I affix my signature.

HYMAN LIEBERMAN.